Figure 4:
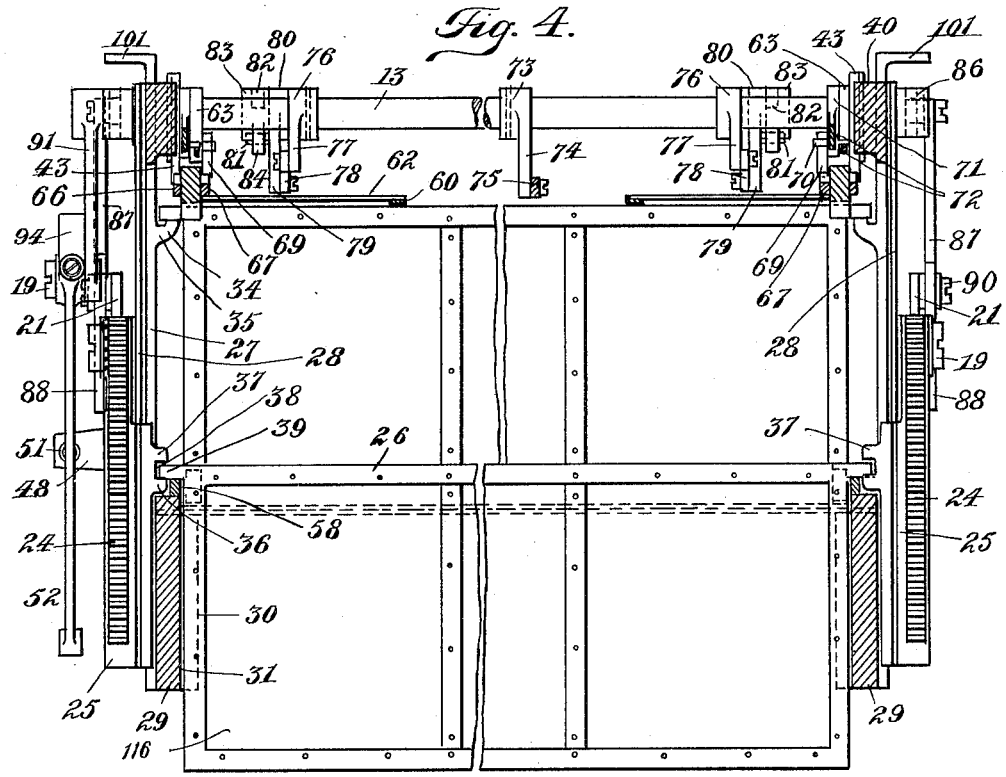

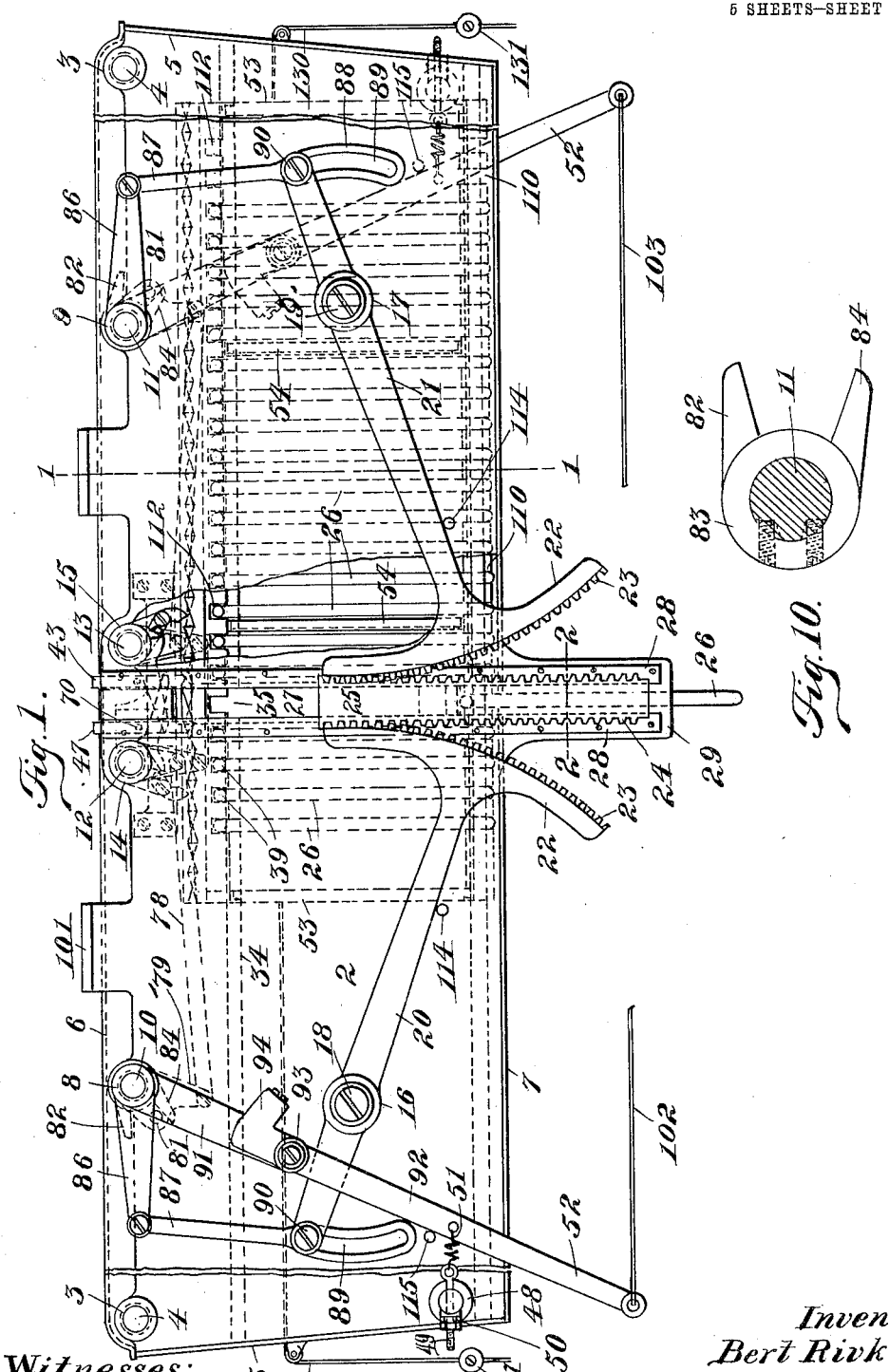

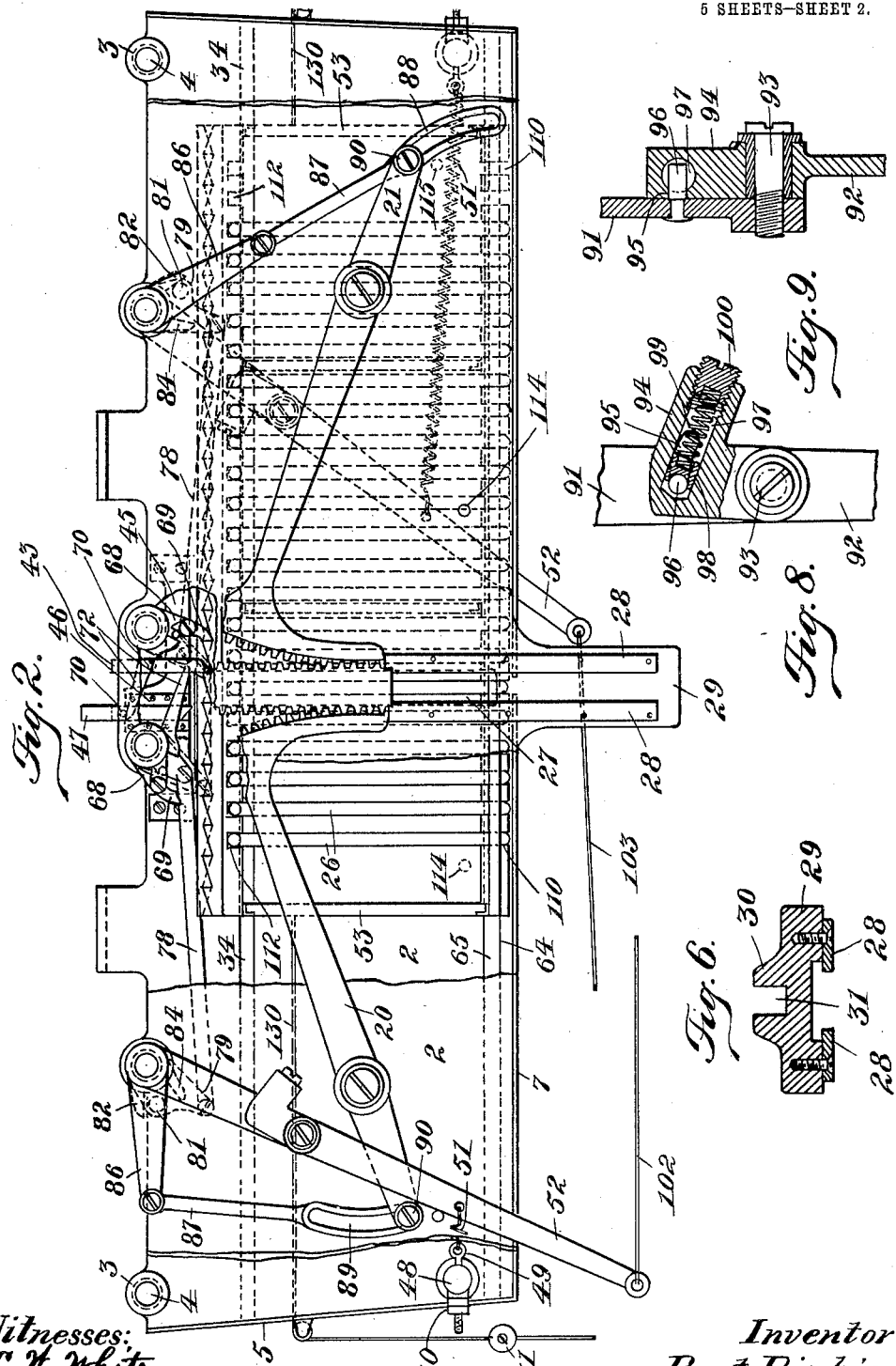

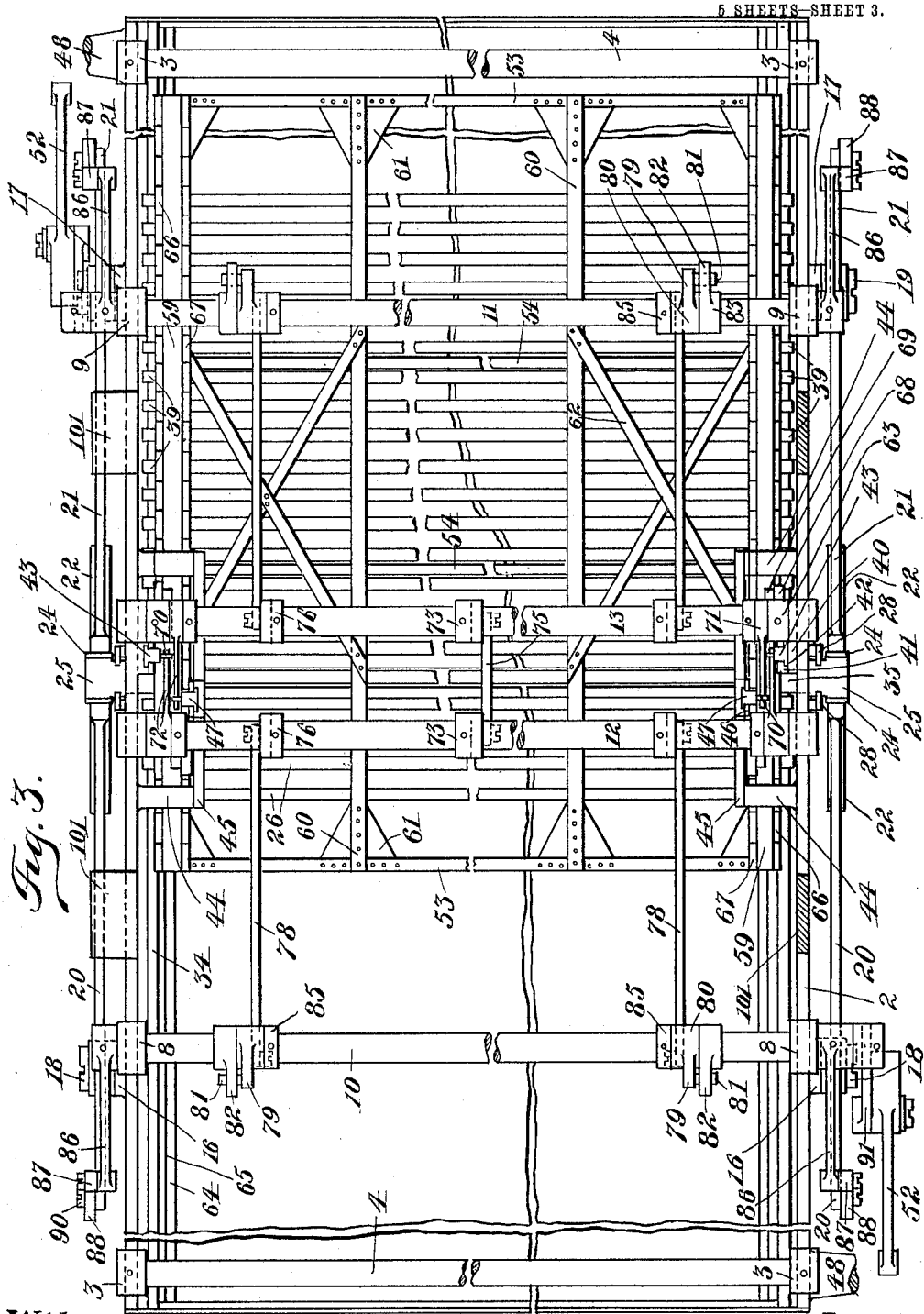

B. RIVKIN.
STATION INDICATOR.
APPLICATION FILED JUNE 16, 1910.

1,083,898.

Patented Jan. 6, 1914.
5 SHEETS—SHEET 4.

Witnesses:
C. W. White
W. W. Hoffman

Inventor:
Bert Rivkin
By his Attorney A. B. Mattingly

B. RIVKIN.
STATION INDICATOR.
APPLICATION FILED JUNE 16, 1910.

1,083,898.

Patented Jan. 6, 1914.
5 SHEETS—SHEET 5.

Witnesses:
C. W. White,
H. H. Hoffmann

Inventor:
Bert Rivkin.
By his Attorney A. B. Mattingly.

UNITED STATES PATENT OFFICE.

BERT RIVKIN, OF NEW YORK, N. Y.

STATION-INDICATOR.

1,083,898.  Specification of Letters Patent.  Patented Jan. 6, 1914.

Application filed June 16, 1910. Serial No. 567,270.

*To all whom it may concern:*

Be it known that I, BERT RIVKIN, a citizen of the United States, and resident of New York, borough of Bronx, in the county of New York and State of New York, have invented certain new and useful Improvements in Station-Indicators, of which the following is a specification.

The object of this invention is to provide a new and simple device in the form of a station indicator that may be used as an advertising device or as a station indicator and advertising device combined.

The further objects are to provide a station indicator that will work under all conditions which it is subject to in use on cars, and which have caused the failure of indicators heretofore patented when put into practical operation, that is to provide an indicator of this class, which will work when the car is going up or down an incline, or on the level roadway, and the signs or display frame will not be dislocated or operated by the jar in the starting or stopping of the car or train, and further to provide an indicator which will work whether the operating cord or cable is given a long or short pull, a jerk, or slow pull. This arrangement is very essential owing to the different manner in which the conductors will operate these devices.

The still further objects are to provide a device of this kind in which the signs or display cards may be easily changed when desired and as often as necessary, and may be operated in displaying the signs in either direction of the route whether going or returning, and may be made to skip the display of any desired number of signs when used on an express train, and further it may be operated backward and forward consecutively at any point without any adjustments or special devices when used on trains which do not run the full route. These features are very desirable in connection with elevated roads where trains are used, as expresses in the rush hours of the day, and as locals during the night, and other hours of the day when the traffic is not so great, and for trains which are used in one direction for carrying passengers, and returned empty to the end of the route, (which is necessary in rush hours). The sign frames after being used or exhibited, may be returned by a secondary cable with one pull instead of successive pulls of the operating cables.

These and other objects may be clearly seen by referring to the drawings forming a part of this specification, of which—

Figure 5:
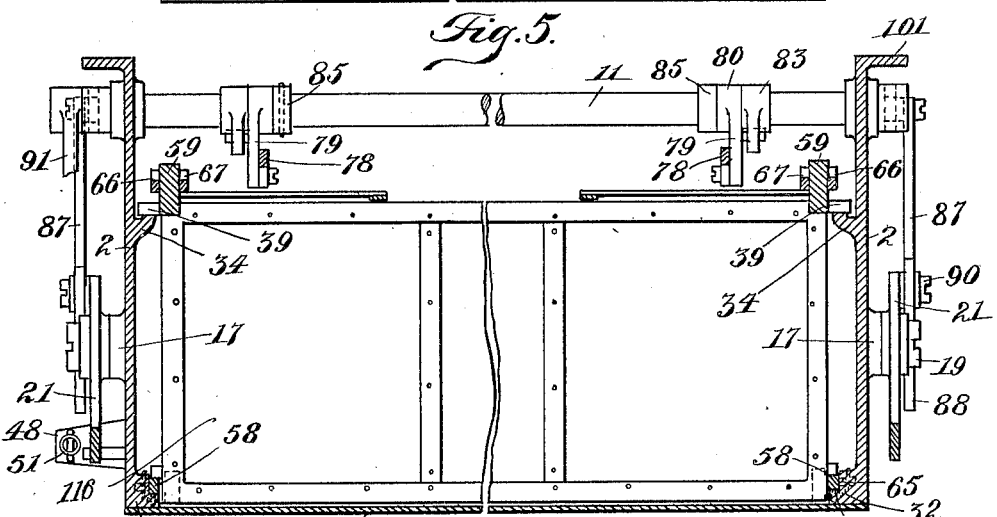
Figure 1:
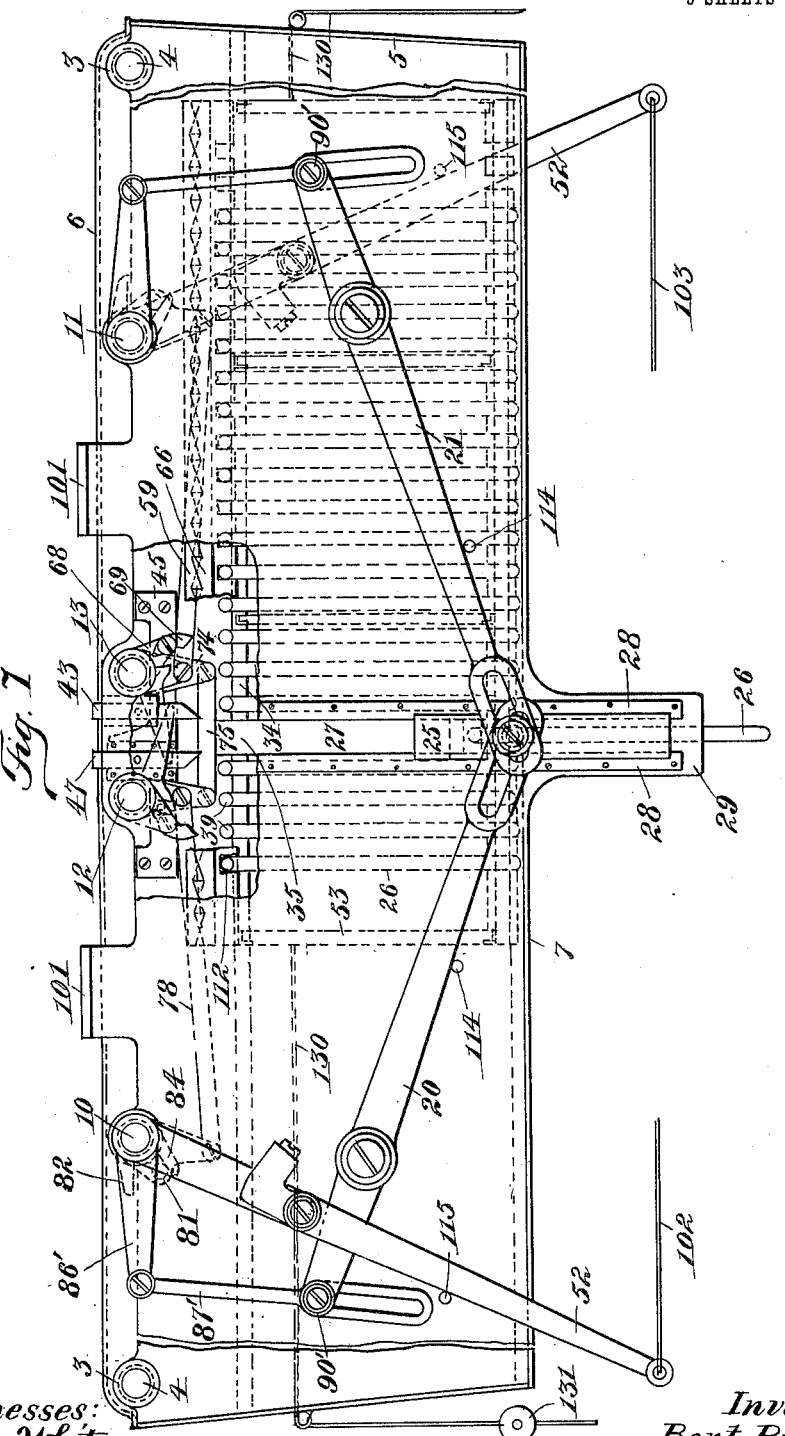

Figure 1, is a side elevation of my invention partially broken away and the several parts resting in their normal position, Fig. 2 is a similar view showing the device being operated in one direction, Fig. 3 is a plan view with the cover or top removed, Fig. 4 is a central vertical section, Fig. 5 is a section on the line 1—1 of Fig. 1, Fig. 6 is a horizontal section on line 2—2 of Fig. 1 looking down, Fig. 7 is a similar view to Fig. 1, showing a modification of the device, Figs. 8 and 9 are enlarged details of a portion of the operating lever, Fig. 10 is a detail of the adjustable collar.

In order to accomplish the foregoing features with a simple and inexpensive combination of mechanism for the results obtained, with an easy and accurate movement of the various parts, I have shown in the drawings one form of the device, and some slight modifications of some of the parts;
but it will be understood that any of the individual parts or several parts of this invention may be changed from the construction shown for the convenience of manufacture if desired, without departing from the spirit of the invention, and I wish to reserve these rights to make such alterations that may be found necessary to meet the various conditions that may arise from the practical and economical mode of manufacture and the successful maintenance of the device.

In the construction for the sake of convenience of illustration, I have shown a pair of side plates 2 in the form of castings which are provided with a plurality of hubs or boxes 3, for connecting rods 4, to relieve the strain on the end plates 5, and the top 6 and bottom 7 of the housing. These rods 4 make the frame very stiff and substantial, and where the indicators are very large, a greater number of these rods may be used than herein shown, other hubs or bearings 8 and 9 are provided for the main operating shafts 10 and 11 which are connected to the secondary shafts 12 and 13 having bearings 14 and 15. Mounted on the bosses 16 and 17 by studs 18 and 19 are operating levers 20 and 21 having segmental ends 22 provided with gear teeth 23 engaging the teeth of the rack bars 24 of the sliding member 25, adapted to raise and lower the sign frames 26. These sliding members are operated in a slot or opening 27, in the side plates 2, and held in position by gibs 28, secured to the side plates. The side plates are further provided with downwardly extending portions 29, which in turn are provided with inwardly extending flanges 30, forming grooves or channels 31, for guiding the sign frames in their operation and preventing them from swinging. Each side plate is further provided at its bottom edge with an inwardly extending flange 32, forming a track or way, upon which the sign carriage 33 is moved in either direction, and the upper portion is provided with a similar flange 34, for supporting and forming a track for the sign frames to be moved upon. These flanges 34, have openings or gaps 35, which are located at the slots 27, which is to allow the sign frame to be raised and lowered. The sliding members 25 are provided with flanges 36, which register with the flanges 34, and fill the gaps 35, when the sliding members 25 are in their upper position and these sliding members are also provided with flanges 37, which are located above the flanges 36, forming slots 38, into which pass the trunnions 39 of the sign frame to be operated. These flanges 37 insure the lowering of the sign frame. The side plates are further provided with rectangular projections 40 upon which are mounted gibs 41 forming a slide way or bearing 42, for the locking slides 43, which prevent the frame carriage from being moved in one direction by any means other than the operating lever. The lugs 44 on the side plates, are for supporting the plates 45, upon which are mounted or secured gibs 46, forming a slide way or bearing for the locking slide 47, for preventing the movement by accident of the frame carriage in the opposite direction. The side plates 2 are further provided with studs 48, through which pass eye bolts 49, having locking nuts 50. These bolts are for adjusting the tension of the spring 51, for returning the operating lever 52.

The frame carriage is composed of a skeleton frame work suitably braced by cross bars, truss and struts. In the following manner, I provide suitable end frames 53 and a plurality of intermediate frames 54. These frames are of a rectangular form, and may be made of angle iron, and braced with corner struts and truss. The lower angle iron 57 of these frames extends beyond the ends of the frame for the purpose of securing them to the slides 58 of the carriage. The upper corners of these frames are secured to the frame guides 59 of the carriage. In order to more securely brace the carriage against the torsional strain, I have secured to the tops of the frames 53 and 54 braces 60, and connected them to the frames by struts 61, and to the frame guides by truss 62. In order to economize space in the height of the device, and to form side bearings, I have cut away the slides at 32, forming sliding surfaces 64 and side guides 65, for the carriage. If desired the sliding surface 64 may be provided with rollers or wheels, to make the carriage move more easily, as shown in Fig 5.

In order to secure the sign frames in the carriage so they may be operated, I have provided the slides 58 with a plurality of vertical slots 110, for the reception of the sign frames, and in which they may be moved up and down, and the upper guides 59 are provided with a plurality of horizontal slots 112, which register with the slots in the slides, and receive the upper edges of the sign frames when they are in their upper position, and their trunnions 39 prevent them from dropping by overlapping and sliding on the flanges 34 of the side plates.

In order that the carriage may be propelled in either direction the guides 59 are provided with ratchet bars 66 on their outsides for moving the carriage in one direction, and with ratchet bars 67, on their inner sides, for moving the carriage in the opposite direction. The secondary shafts 12 and 13 are provided with collars 63 having arms 68 carrying by-pass pawls 69. The pawls 69 of the shaft 12, are for pushing the carriage in one direction by engaging the ratchet bars 67, and the pawls 69 of the shaft 13, move the carriage in the opposite direction, by engaging the ratchet bars 66. The locking slides 43 engage the teeth of ratchet bars 66 and prevent the carriage from being moved in one direction, and the locking slides 47 engaging the teeth of the ratchet bars 67. This prevents the carriage from being moved in the opposite direction. These locking slides are provided with projection pins 70, by which the slides are raised when it is desired to move the carriage. The carriage is further provided with secondary cables 130 which are used to return the carriage to either end of its tracks when desired, instead of operating it back by the operating cables. These cables are passed out and through the ends of the housing of the indicator and may be provided with stops 131 in form of balls having binding screw, or other means may be used for preventing the cables' ends from working through the opening in the ends of the housing and out of reach of the operator. The collars 71 are further provided with arms 72 which raise the locking slides by means of the pins 70. These secondary shafts 12 and 13 are further provided with collars 73, having depending arms 74, connected by a link 75, and which causes the shafts to move in unison. These shafts are still further provided with collars 76, having depending arms 77 connected by links 78 to the main shafts 10 and 11, by the depending arms 79 of the loose collar 80 of the main shafts. These arms 79 are provided with pins or studs 81, which are engaged by the arms 82, on the tight but adjustable collars 83, during the last part of the forward movement of the main shafts, when the operating lever 52 is pulled or moved, the arms 84 on the return of the main shafts engage the pins or studs 81 to insure the returning of the secondary shafts to their proper or normal positions. The collars 80 are held in their proper position or alinement by the collars 85, which are secured to the main shafts in any suitable manner, and the collars 83. The main shafts are provided with arms 86 which are provided with pivoted links 87, which operate the operating levers 20 and 21, these links 87 are provided with a segmental or curved end 88 having a curved slot 89 in which the pivots 90 of the operating levers 20 and 21 work, this construction enables the device to be operated by either of the levers 52 without operating the entire mechanism.

The operating levers 52 are made in two parts 91 and 92 which are pivoted together at 93, by a screw and stud bearing. The upper portion 94 of the part 92 of the lever 52, is of an enlarged angular form the inner side of which has a slot 95, which is concentric with the pivot bearing, and allows a pin 96 on the arm 91 to extend into the bore or chamber 97, in which is a shoe 98 and a spring 99 which causes the shoe to bear on pin 96. The outer end of the bore is provided with an adjusting screw 100, for increasing the pressure of the spring.

It will be noted that it is not absolutely necessary to have all of the parts duplicated, as I have shown them on both sides of the device, but I prefer this construction in order to insure a more even and easier movement of the carriage and other parts.

The sign frames are shown as rectangular in form, and made of a metal which is of an oval form in cross section; but this exact shape is not absolutely essential as other forms could be readily used in its place. In the preferred form of the sign frame, I have shown it provided with a plurality of spaces, and for convenience I shall call these spaces pockets 116. In this instance there are shown three to a side, but more or less could be used if desired. The central one is used for the sign indicating the station or stop, and any other information pertaining thereto, while the others are used for advertisements.

In the modification shown in Fig. 7, the entire construction is not changed, but this view is to illustrate one mode of lifting the sliding members. Many other styles of mechanism could be shown to accomplish this result herein shown, but it is not thought necessary to show them here. I have also shown a slight alteration or modification in the link 87, the slot 89 being made straight instead of arc shape. This link 87' with the straight slot will swing on the pivot of the arm 86' when the pivot 90' moves up and down. The swinging movement compensates for the arc movement of pivot 90'.

I have not shown the indicator attached to a car or other vehicle, it not being thought necessary; but I have shown ears 101 extending upwardly from the side plates, and having flanges extending outwardly, whereby the device may be bolted to the ceiling of the car; but any other suitable means may be used to secure the device in position.

The operating cables 102 and 103 may be passed over pulleys or through guides, as now used, or any other suitable devices to the ends of the car.

To operate the device you simply pull the cable 103, which operates the lever 52 and rocks the main shaft 11 and causes the arm 86 to move in an arc downwardly, thus causing the link 87 to force the short arm of the lever 21 down, and the segmental portion to swing or move up. The teeth of the segment will cause the sliding member 25 to move upwardly carrying the sign frame with it, which has been exposed to view, it being understood that when the device is not being operated, there is always one of the signs in the sliding member 25 which is exposed to the view from both sides or either end of the car. The upward movement of the sliding member 25 will carry the segmental lever 20 up with it, and the pivot 90 of its short end will move downwardly in the slot 89, and not cause any of the mechanism connected with it to move. During the last part of the movement of the shaft 11, the arms 82 come into contact with the pins 81 of the arms 79, causing the arms 79 to move forward and rock the shaft 13 through the links 78 and the arms 77. The rocking of the shaft 13 causes the pawls to engage the teeth of the ratchet bars 66 and move the frame carriage forward. The sign frame in the sliding member 25, having entered the slots 112 of the guides 59 just before the moving of the frame carriage, will be moved out by the carriage and another one will take its place ready to be lowered. In order that the carriage may be moved, the arms 72 of the shaft 13 will raise the locking slides 47 by means of the pins 70 when the shaft is rocked. The arms 74 and link 75 cause the shaft 12 to move in unison with the shaft 13 and thus throw the pawls of shaft 12 backward out of the way, so they will not interfere with the movement of the carriage. The incline of the teeth of the ratchet bars will in their movement raise the locking slide 43 and allow it to fall as soon as the carriage has moved the proper distance, and prevent it from being moved backward by accident. The releasing of the cable 103 will allow the spring 51 to return the lever 52 to its normal position and in so doing the arms 84 engage the pins 81 and through the mechanism already described will return the shafts 12 and 13 to their normal position and allow the locking slide 47 to drop in its locking position with the ratchet bars. These locking slides may be spring depressed if desired. The returning of the shafts to their normal positions allows the levers 20 and 21 with the slide 25 to return to their normal position and rest on the pins or studs 114. This will be accomplished by their weight, together with the weight of the sign frame. The weight of these members may be made sufficient to return the lever 52 to its normal position against the pin or stud 115, together with the rest of the auxiliary mechanism operated by it, to their normal positions, thus doing away with the necessity of the spring 51.

It will be seen that each sign may be exhibited in succession by simply pulling the cable 103 until the carriage has registered the last sign with the sliding member 25, but this is not necessary, for if desired, by pulling the cable 102 the carriage will be operated or moved in the opposite direction, and the operation is exactly the same as that described already, and the reverse movement of the carriage may be made at any time without causing any trouble with the mechanism; that is, the carriage may be moved and exhibit the signs in one direction, and then moved in the reverse direction to exhibit the signs in their reverse order at any time or stage after one or more signs have been exhibited. If desired to skip any of the signs it may be done by simply pulling the cable its full stroke, and then letting it return a slight amount, but sufficient to allow the shafts 12 and 13 to rock, then by giving the cable a short pull the carriage will be moved, taking the sign already in the sliding members out, and transferring the next sign thereinto without lowering the sliding member. By repeating the short strokes as many signs may be transferred as desired without exposing them to view, and when the sign desired to be exhibited is in the sliding members the cable is released and the sign drops into view as before described. If it is desired to return the signs back to their normal positions, or in other words, to return them back to the starting point, or the first sign, or the last sign in the carriage to the exhibiting point of the indicator, after they or part of them have been exhibited in one direction, and it is not desirable to exhibit them consecutively in the reverse direction, they may be returned by simply pulling either of the operating cables until the sliding members are in their upper position and while in this position the carriage may be pulled in either direction which is desired until the end of the track is reached and any or all of the signs may be passed through the sliding members without being operated or exposed to view.

In order that the mechanism of the indicator will not be damaged by the jerking of the operating cables or by the cables being given a too severe pull, the safety device which is provided on the levers 52, will take the strain or jar. When the cable is given a jerk the pivoted joint will take the quick action and bend, the tension of the spring will cause the lever to straighten and thus impart an even movement to the mechanism and carriage. If the cable is given a longer pull than necessary the spring 99 will allow the lever 52 to bend upon its pivot joint and thus compensate for the excess movement imparted to it by the cable, and the spring will take all of the strain instead of the mechanism, and when the mechanism has completed its movements and the cable is released, the spring will force the lever into its normal position.

I claim as my invention:

1. In a station indicator, a casing, a carriage movable in the casing and provided with a series of pockets, a set of frames one for each pocket, exhibiting means on the casing for shifting the frames, means for moving the carriage in one direction step-by-step to bring the frames successively to the exhibiting means and to cause the operation of the exhibiting means as each frame is brought to such position, means for moving the carriage in the opposite direction step-by-step to bring the frames successively to the exhibiting means and to cause the operation of the exhibiting means as each frame is brought to such position, and means for locking the carriage to prevent movement by accident.

2. In a station indicator, a casing, a carriage movable in the casing and provided with a series of pockets, a set of frames one for each pocket, exhibiting means on the casing for shifting the frames, means for moving the carriage in one direction step-by-step to bring the frames successively to the exhibiting means and to cause the operation of the exhibiting means as each frame is brought to such position, means for moving the carriage in the opposite direction step-by-step to bring the frames successively to the exhibiting position and to cause the operation of the exhibiting means as each frame is brought to such position, each said moving means for the carriage being arranged to move the carriage without causing the operation of the exhibiting means when desired.

3. In a station indicator, a casing, a carriage movable in the casing and provided with a series of pockets, a set of frames one for each pocket, exhibiting means on the casing for shifting the frames, means for moving the carriage in one direction step-by-step to bring the frames successively to the exhibiting means and to cause the operation of the exhibiting means as each frame is brought to such position, means for moving the carriage in the opposite direction step-by-step to bring the frames successively to the exhibiting position and to cause the operation of the exhibiting means as each frame is brought to such position, each said moving means for the carriage having a loose connection with the exhibiting means to prevent its being actuated by the movement of the other moving means.

4. In a station indicator, a casing, a carriage movable in the casing and provided with a series of pockets, a set of frames one for each pocket, exhibiting means on the casing for shifting the frames as brought to a certain position, means including a lever for moving the carriage step-by-step in one direction to bring the frames successively to the exhibiting position, a slotted link connected with said lever, a lever connected to the exhibiting means, a pin on the latter lever and engaging the slotted portion of the link to provide a loose connection between the carriage moving lever and the exhibiting means, a second lever having means for moving the carriage step-by-step in the opposite direction to bring the frames successively to the exhibiting position, a slotted link connected with the second lever, a second lever connected with the exhibiting means, a pin on the latter lever and engaging the slotted portion of the second mentioned link to provide a loose connection between the second carriage moving lever and the exhibiting means.

5. In a station indicator, a casing, a carriage movable in the casing and provided with a series of pockets, a set of frames one for each pocket, exhibiting means on the casing for shifting the frames as brought to a certain position, means including a lever for shifting the carriage in one direction step-by-step to bring the frames successively to the exhibiting position, a slotted link connected with said lever, a rack on the exhibiting means, a segment lever meshing with said rack, a pin on the latter lever engaging the slotted portion of the link to provide a loose connection between the carriage moving means and the exhibiting means, a second lever having means for moving the carriage step-by-step in the opposite direction to bring the frames successively to the exhibiting position, a slotted link connected with the second lever, a second rack on the exhibiting means, a segment lever meshing with the second rack, a pin on the latter lever engaging the slotted portion of the latter slotted link to provide a loose connection between the second carriage moving lever and the exhibiting means.

6. In a station indicator, a casing, a carriage movable in the casing and provided with a series of pockets, a set of frames one for each pocket, an exhibiting slide, duplicate sets of slide and carriage moving means, each comprising a lever connected with the slide, a rock arm member, a slotted link pivoted to the rock arm, a pin on the lever engaging the slotted portion of the link, limit stops on the rock arm member, a second arm having a pin arranged to engage the limit stops, a swinging pawl, means including a bar connecting the pawl with the second arm, said carriage having a pair of reversed rack bars adapted to be engaged by said pawls respectively to move the carriage in opposite directions.

7. In a station indicator, a casing, a carriage movable in the casing and provided with a series of pockets, a set of frames one for each pocket, an exhibiting slide, duplicate sets of slide and carriage moving means, each comprising a lever connected with the slide, a rock arm member, a slotted link pivoted to the rock arm, a pin on the lever engaging the slotted portion of the link, limit stops on the rock arm member, a second arm having a pin arranged to engage the limit stops, a swinging pawl, means including a bar connecting the second arm with the pawl, said carriage having a pair of reversed rack bars adapted to be engaged by said pawls respectively, and a stop pawl adapted to be operated by each pawl to prevent reverse movement of the carriage.

8. In a station indicator, a casing, a carriage movable in the casing and provided with a series of pockets, a set of frames one for each pocket, an exhibiting slide provided with a pair of racks, duplicate sets of slide and carriage moving means each comprising, a segment lever engaging one of the racks, a rock arm member, a slotted link pivoted to the rock arm member, a pin on the lever engaging the slotted portion of the link, limit stops on the rock arm member, a second lever having a pin arranged to engage the limit stops, a swinging pawl, and means including a bar connecting the pawl with the second arm, the carriage having a pair of reversed rack bars adapted to be engaged by said pawls respectively to move the carriage in opposite directions.

9. In a station indicator, a casing, a carriage movable in the casing and provided with a series of pockets, a set of frames one for each pocket, an exhibiting slide provided with a pair of racks, duplicate sets of slide and carriage moving means each comprising, a segment lever engaging one of said racks, a rock arm member, a slotted link pivoted to the rock arm, limit stops on the rock arm member, a second arm having a pin arranged to engage the limit stops, a swinging pawl, and means including a bar connecting the pawl with the second arm, the carriage having a pair of reversed rack bars adapted to be engaged by said pawls respectively, and a stop pawl adapted to be operated by each said pawl to prevent reverse movement of the carriage.

10. In a station indicator, a casing, a carriage movable in the casing and provided with a series of pockets, a set of frames one for each pocket, an exhibiting slide, duplicate sets of slide and carriage moving means, each comprising a lever connected with the slide, a rock arm member, a link pivoted to the rock arm and engaging the lever, limit stops on the rock arm member, a second arm having a pin arranged to engage the limit stops, a swinging pawl, means including a bar connecting the pawl with the second arm, the carriage having a pair of reversed rack bars adapted to be engaged by said pawls respectively to move the carriage in opposite directions.

11. In a station indicator, a casing, a carriage movable in the casing and provided with a series of pockets, a set of frames one for each pocket, an exhibiting slide, duplicate sets of slide and carriage moving means, each comprising a lever connected with the slide, a rock arm member, a link pivoted to the rock arm and engaging the lever, limit stops on the rock arm member, a second arm having a pin arranged to engage the limit stops, a swinging pawl, means including a bar connecting the pawl with the second arm, the carriage having a pair of reversed rack bars adapted to be engaged by said pawls respectively to move the carriage in opposite directions, and a stop pawl adapted to be operated by each said pawl to prevent reverse movement of the carriage.

12. In a station indicator, a casing, a carriage movable in the casing and provided with a series of pockets, a set of frames one for each pocket, an exhibiting slide provided with a pair of racks, duplicate sets of slide and carriage moving means, each comprising, a segment lever engaging one of the racks respectively, a rock arm member, a link pivoted to the rock arm and engaging the lever, limit stops on the rock arm member, a second arm having a pin arranged to engage the limit stops, a swinging pawl, and means including a bar connecting the pawl with the second arm, the carriage having a pair of reversed rack bars adapted to be engaged by said pawls respectively to move the carriage in opposite directions.

13. In a station indicator, a casing, a carriage movable in the casing and provided with a series of pockets, a set of frames one for each pocket, an exhibiting slide provided with a pair of racks, duplicate sets of carriage and slide moving means, each comprising, a segment lever engaging one of the racks respectively a rock arm member, a link pivoted to the rock arm, and engaging the lever, limit stops on the rock arm member, a second arm having a pin arranged to engage the limit stops, a swinging pawl, and means including a bar connecting the pawl with the second arm, the carriage having a pair of reversed rack bars adapted to be engaged by said pawls respectively to move the carriage in opposite directions, and a stop pawl adapted to be operated by each said pawl respectively for preventing reverse movement of the carriage.

Signed at New York, in the county of New York and State of New York, this 3rd day of June A. D. 1910.

BERT RIVKIN.

Witnesses:
MORRIS ROSENHEIM,
WILLIAM WOLFSKEHL.